United States Patent
Chae et al.

(10) Patent No.: US 10,506,379 B2
(45) Date of Patent: Dec. 10, 2019

(54) METHOD AND DEVICE FOR TRANSMITTING/RECEIVING INFORMATION RELATED TO BAROMETER IN WIRELESS COMMUNICATION SYSTEM

(71) Applicant: LG ELECTRONICS INC., Seoul (KR)

(72) Inventors: Hyukjin Chae, Seoul (KR); Hyunho Lee, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/562,871

(22) PCT Filed: Apr. 7, 2016

(86) PCT No.: PCT/KR2016/003655
§ 371 (c)(1),
(2) Date: Sep. 28, 2017

(87) PCT Pub. No.: WO2016/163778
PCT Pub. Date: Oct. 13, 2016

(65) Prior Publication Data
US 2018/0115865 A1    Apr. 26, 2018

Related U.S. Application Data

(60) Provisional application No. 62/144,324, filed on Apr. 7, 2015.

(51) Int. Cl.
*H04W 24/00*    (2009.01)
*H04W 4/029*    (2018.01)
(Continued)

(52) U.S. Cl.
CPC .............. *H04W 4/029* (2018.02); *G01C 5/06* (2013.01); *H04W 4/02* (2013.01); *H04W 4/025* (2013.01);
(Continued)

(58) Field of Classification Search
CPC .............................. H04W 4/02; H04W 64/003
See application file for complete search history.

(56) References Cited

U.S. PATENT DOCUMENTS

2012/0236989 A1*  9/2012  Hardman ............. G01N 23/223
                                                                378/45
2012/0290253 A1   11/2012  Barrett et al.
(Continued)

FOREIGN PATENT DOCUMENTS

JP     2002358321    12/2002
JP     2010121953     6/2010
(Continued)

OTHER PUBLICATIONS

PCT International Application No. PCT/KR2016/003655, Written Opinion of the International Searching Authority dated Aug. 4, 2016, 17 pages.
(Continued)

*Primary Examiner* — Justin Y Lee
(74) *Attorney, Agent, or Firm* — Lee Hong Degerman Kang & Waimey

(57) ABSTRACT

One embodiment of the resent invention is a method for a user equipment transmitting/receiving information related to a barometer in a wireless communication system, the method for transmitting/receiving information related to a barometer comprising the steps of: transmitting positioning information to an evolved NodeB; receiving temperature/humidity information based on the positioning information; and transmitting, to the evolved NodeB, barometer infor-
(Continued)

mation based on the temperature/humidity information, wherein the barometer information is corrected using the temperature/humidity information.

10 Claims, 14 Drawing Sheets

(51) Int. Cl.
| | | |
|---|---|---|
| *H04W 56/00* | (2009.01) | |
| *H04W 64/00* | (2009.01) | |
| *H04W 4/02* | (2018.01) | |
| *G01C 5/06* | (2006.01) | |
| *H04W 4/38* | (2018.01) | |
| *H04W 4/70* | (2018.01) | |

(52) U.S. Cl.
CPC ........... *H04W 56/00* (2013.01); *H04W 64/00* (2013.01); *H04W 4/38* (2018.02); *H04W 4/70* (2018.02)

(56) References Cited

U.S. PATENT DOCUMENTS

| | | | |
|---|---|---|---|
| 2014/0135040 A1 | 5/2014 | Edge et al. | |
| 2015/0233713 A1* | 8/2015 | Wolf | G01O 5/06 |
| | | | 702/166 |
| 2016/0047649 A1* | 2/2016 | Edge | H04W 4/025 |
| | | | 455/73 |
| 2016/0148130 A1* | 5/2016 | Krishnan | G06Q 10/0633 |
| | | | 705/7.27 |

FOREIGN PATENT DOCUMENTS

| | | |
|---|---|---|
| JP | 2014173887 | 9/2014 |
| KR | 1020040085264 | 10/2004 |
| KR | 1020140037152 | 3/2014 |
| WO | 2014202111 | 12/2014 |

OTHER PUBLICATIONS

European Patent Office Application Serial No. 16776881.1, Search Report dated Sep. 10, 2018, 8 pages.

* cited by examiner (a)

(b)

(a)

D2D signal transmission from a UE allocated with unit # 0

(b)

METHOD AND DEVICE FOR TRANSMITTING/RECEIVING INFORMATION RELATED TO BAROMETER IN WIRELESS COMMUNICATION SYSTEM

CROSS-REFERENCE TO RELATED APPLICATIONS

This application is the National Stage filing under 35 U.S.C. 371 of International Application No. PCT/KR2016/003655, filed on Apr. 7, 2016, which claims the benefit of U.S. Provisional Application No. 62/144,324, filed on Apr. 7, 2015, the contents of which are all hereby incorporated by reference herein in their entirety.

TECHNICAL FIELD

Following description relates to a wireless communication system, and more particularly, to a method for a user equipment to transmit and receive information related to a barometer and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Device-to-Device (D2D) communication means a communication system for directly exchanging audio, data and the like between user equipments without passing through a base station (evolved NodeB: eNB) by establishing a direct link between the user equipments. D2D communication may include such a system as a UE-to-UE (user equipment-to-user equipment) communication, Peer-to-Peer communication and the like. And, the D2D communication system may be applicable to M2M (Machine-to-Machine) communication, MTC (Machine Type Communication) and the like.

D2D communication is currently considered as one of schemes for setting a load put on a base station due to the rapidly increasing data traffic. For instance, according to D2D communication, unlike an existing wireless communication system, since data is exchanged between devices without passing through a base station, overload of a network can be reduced. Moreover, by introducing D2D communication, it is able to expect effects such as procedure reduction of a base station, power consumption reduction of devices involved in D2D, data transmission speed increase, reception capability increase of a network, load distribution, extension of cell coverage and the like.

DISCLOSURE OF THE INVENTION

Technical Task

When a barometer is used to measure a more accurate position, a technical task of the present invention is to provide a method of transmitting and receiving information related to the barometer.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting and receiving information related to a barometer, which is transmitted and received by a user equipment (UE) in a wireless communication system, includes the steps of transmitting positioning information to an eNB, receiving temperature/humidity information based on the positioning information, and transmitting barometer information based on the temperature/humidity information to the eNB. In this case, the barometer information can be corrected using the temperature/humidity information.

The eNB may consider the barometer information as invalid, wherein the barometer information is firstly transmitted by a UE which has not transmit a positioning information.

The temperature/humidity information based on the positioning information may correspond to information measured by a network node closest to a horizontal position of the UE.

The network node may correspond to one selected from the group consisting of an eNB, an AP (access point), and a location server.

The UE can include the barometer information in a discovery signal or a communication signal.

The positioning information may correspond to an RSTD (reference signal time difference) measurement result.

To further achieve these and other advantages and in accordance with the purpose of the present invention, according to a different embodiment, a method of transmitting and receiving information barometer information, which is transmitted and received by an eNB in a wireless communication system, includes the steps of receiving positioning information from a user equipment (UE), transmitting temperature/humidity information for the UE based on the positioning information of the UE, and receiving barometer information from the UE in response to the transmission of the temperature/humidity information. In this case, the barometer information can be corrected using the temperature/humidity information.

The eNB may consider the barometer information as invalid, wherein the barometer information is firstly transmitted by a UE which has not transmit a positioning information.

The temperature/humidity information based on the positioning information may correspond to information measured by a network node closest to a horizontal position of the UE.

The network node may correspond to one selected from the group consisting of an eNB, an AP (access point), and a location server.

The UE can include the barometer information in a discovery signal or a communication signal.

The positioning information may correspond to an RSTD (reference signal time difference) measurement result.

Advantageous Effects

According to the present invention, it is able to measure a precise position by reducing an error due to surrounding environment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
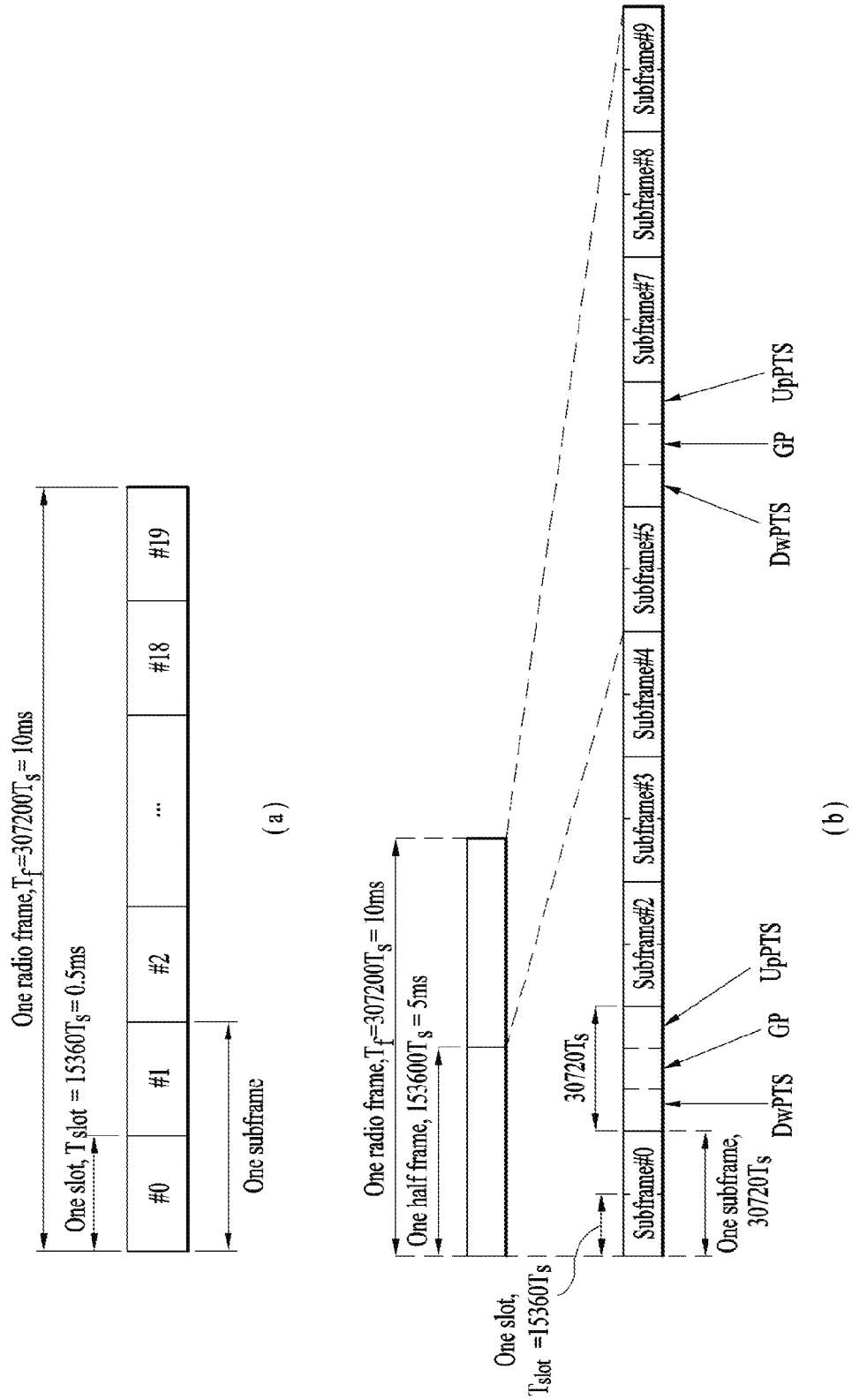
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
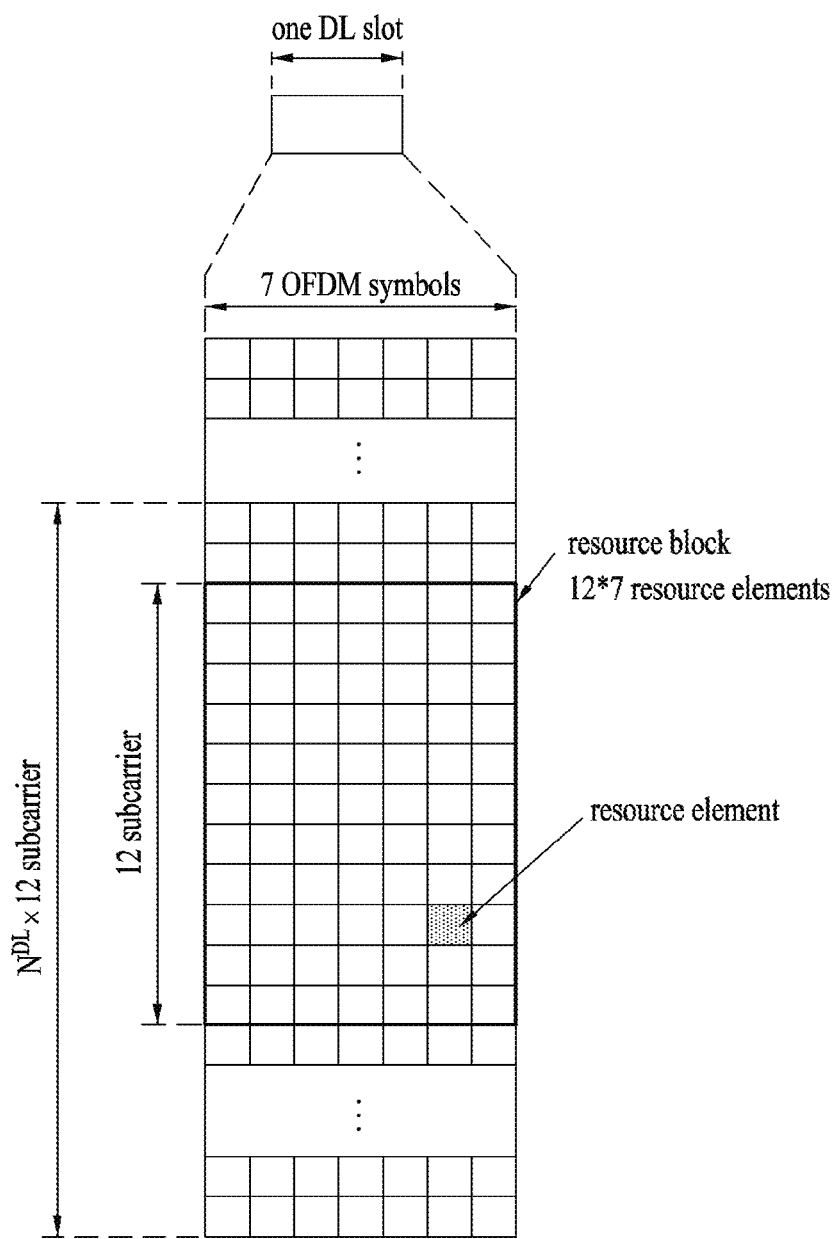
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
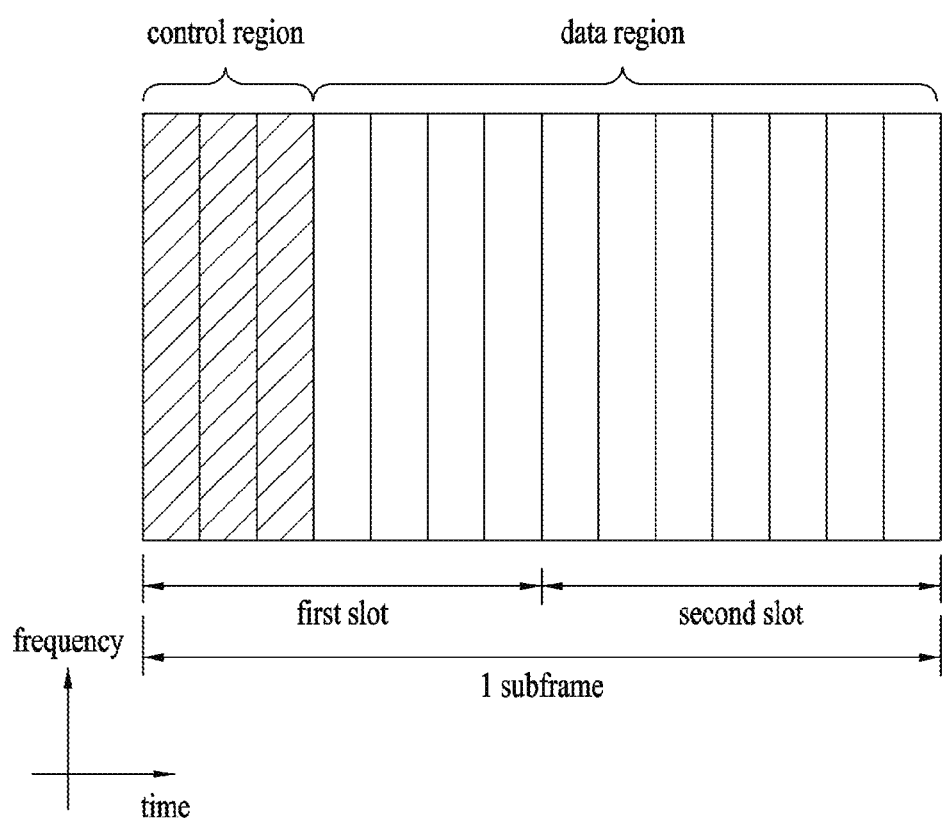
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
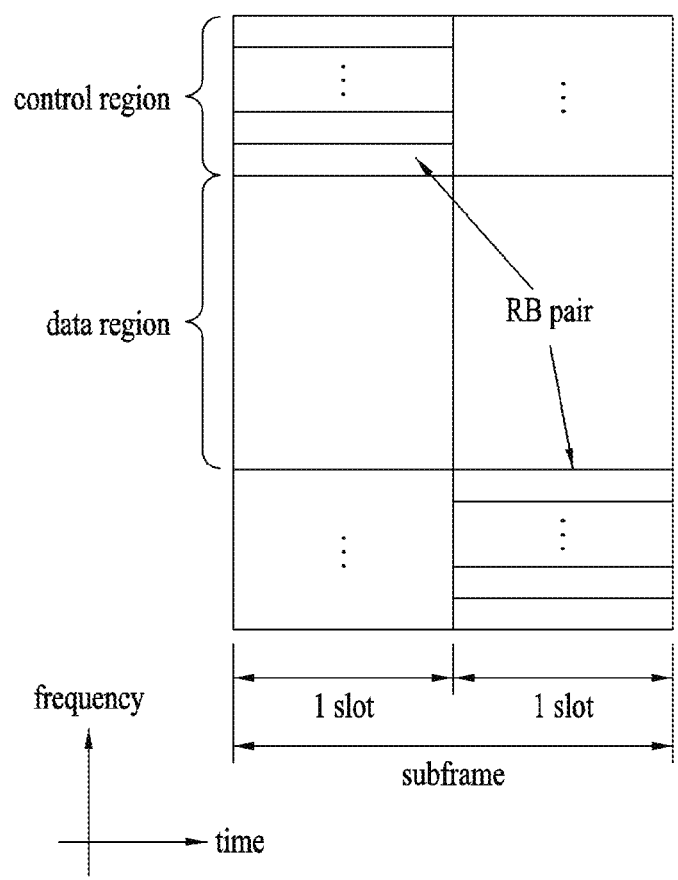
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
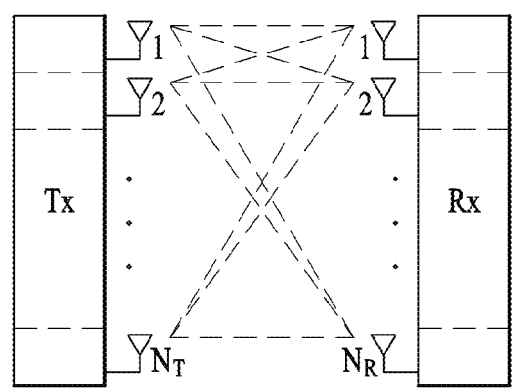
FIG. 5 is a diagram for a configuration of a wireless communication system having multiple antennas.
Figure 5:
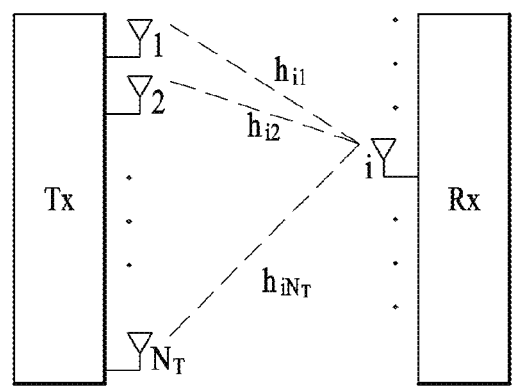

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \vdots \\ w_{i1} & w_{i2} & \ldots & w_{iN_T} \\ \vdots & & \ddots & \vdots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix}$$ [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
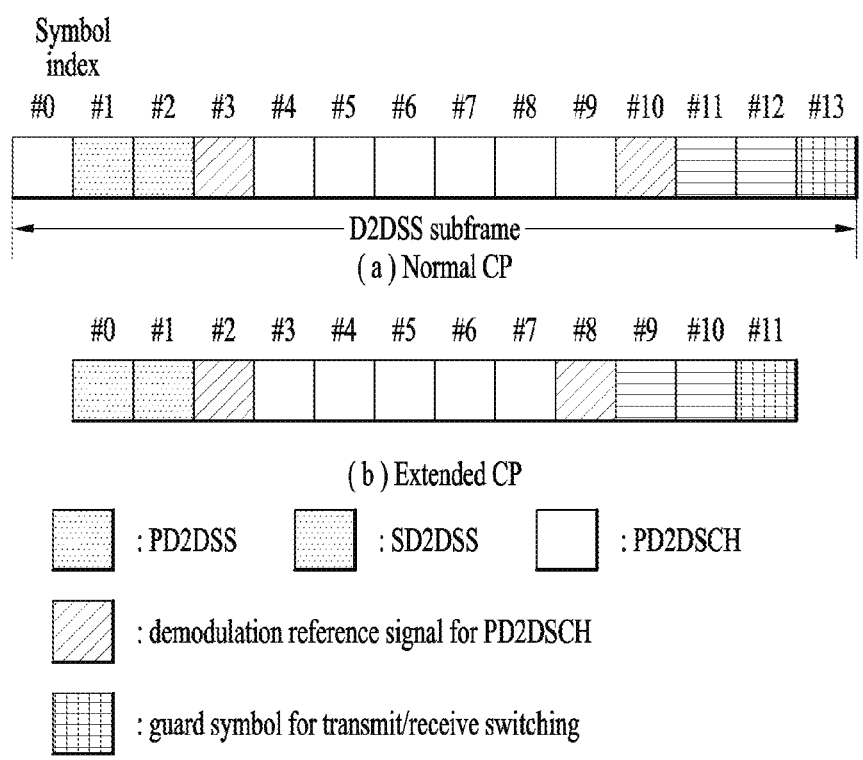
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
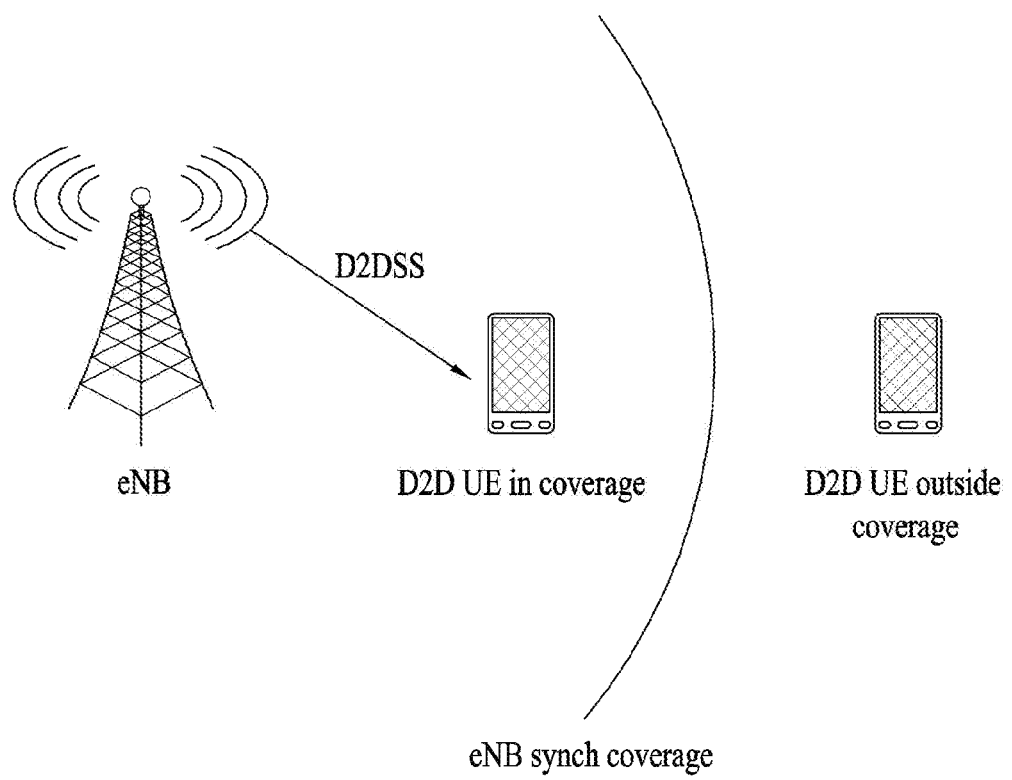
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
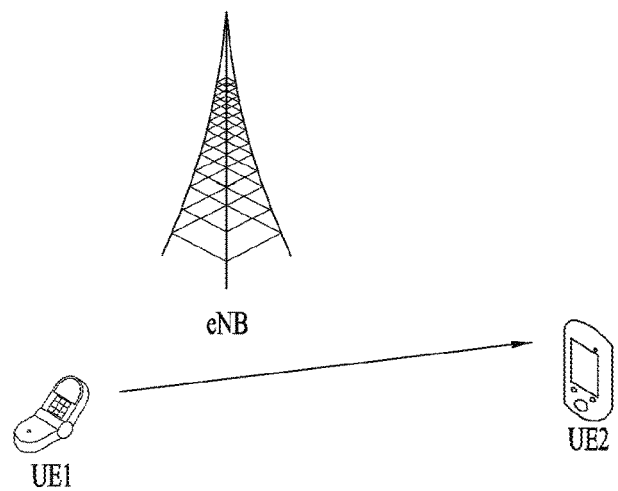
FIG. 8 is a diagram for an example of a D2D resource pool for performing D2D communication.
Figure 8:
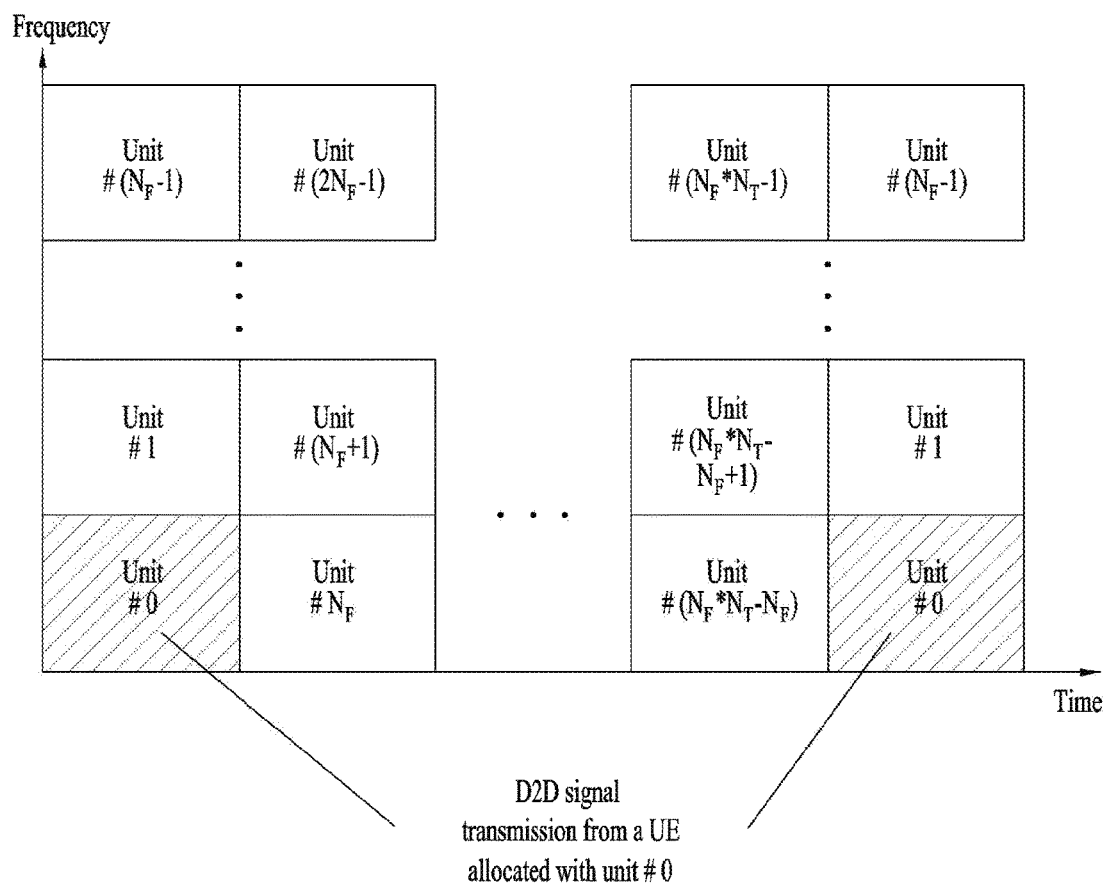

FIG. 8 shows an example of a UE1, a UE2 and a resource pool used by the UE1 and the UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
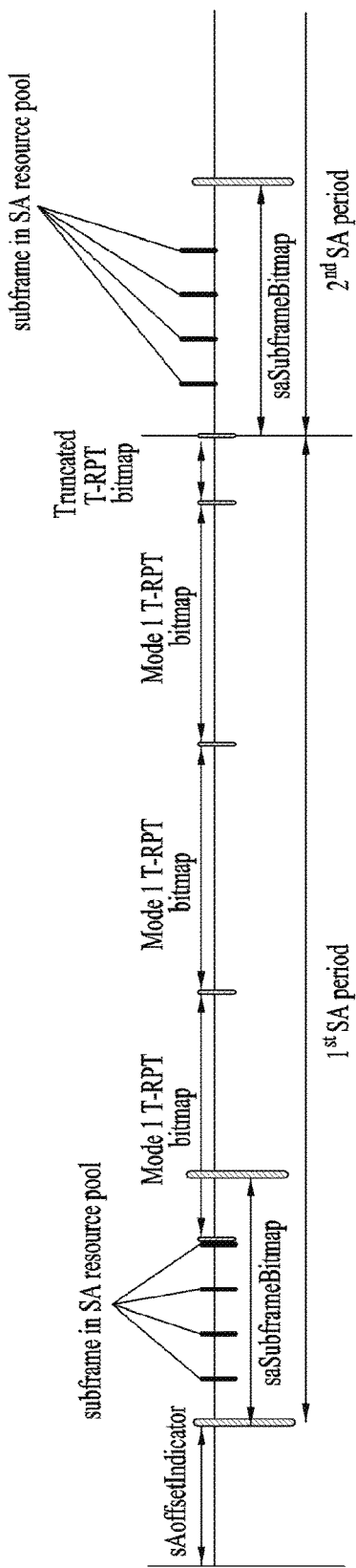
FIG. 9 is a diagram for explaining an SA period.
Figure 10:
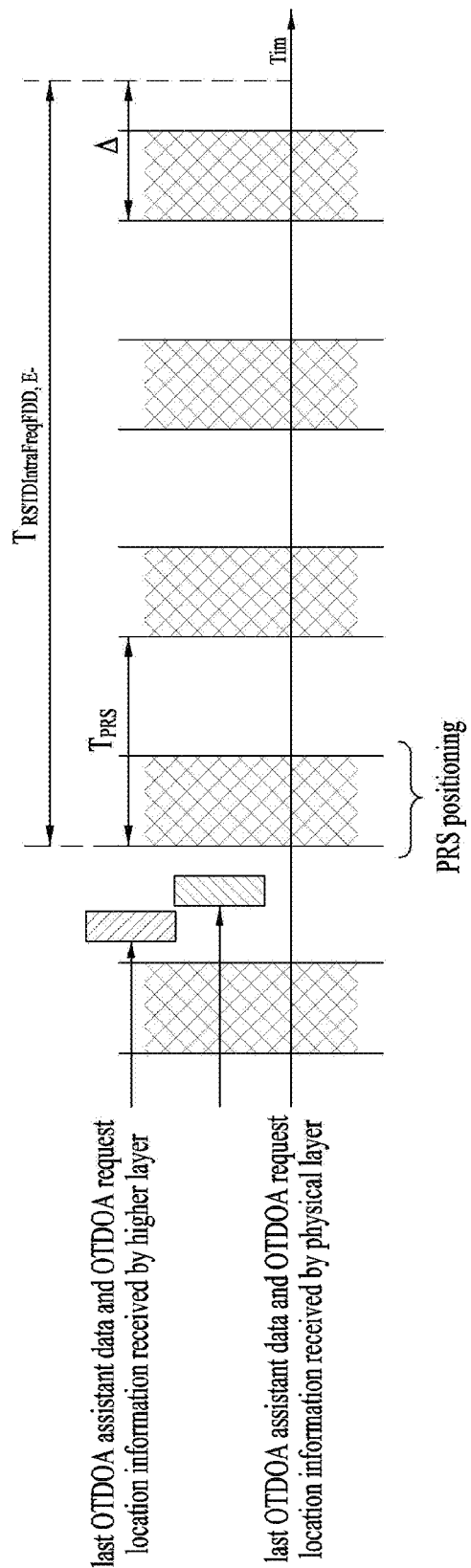
FIG. 10 is a diagram for explaining OTDOA.
Figure 11:
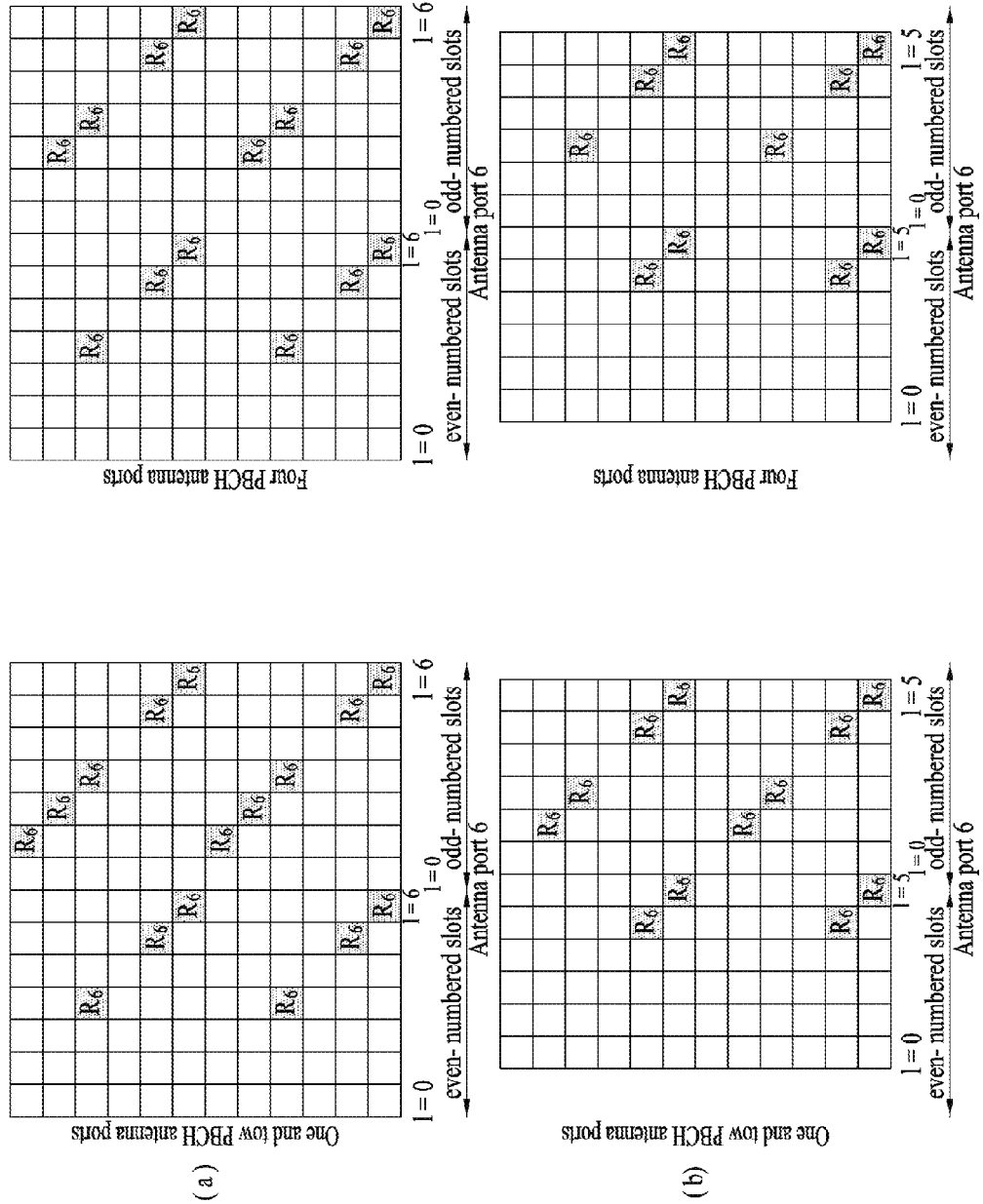
FIGS. 11 to 12 are diagrams for explaining a PRS.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. SA can indicate a transmission position of data using a T-RPT form or a different explicit method. For example, the SA may indicate a start point of data transmission, a repetition count, and the like. More generally, the SA corresponds to a channel configured to indicate a time/frequency position of a data transmission resource and the channel which is transmitted in a manner of including additional information necessary for decoding a data. Although the SA resource pool can be separated from a data pool, the SA resource pool may use a part of a data region together with the data pool in a manner of being overlapped with the data pool. And, the data pool and the SA resource pool can be separated from each other in frequency domain rather than time domain.

UE Location Information

In general, in order for a network to obtain location information of a UE, various methods are used in a cellular communication system. As a representative method, a UE receives PRS (positioning reference signal) transmission-related configuration information of a base station from a higher layer signal and measures PRSs transmitted by cells adjacent to the UE to calculate location-related information of the UE using a positioning scheme such as OTDOA (observed time difference of arrival) and forwards the calculated information to the network. Besides, an assisted global navigation satellite system (A-GNSS) positioning scheme, enhanced cell-ID (E-CID) techniques, uplink time difference of arrival (UTDOA), and the like exist. The abovementioned positioning schemes can be utilized for various location-based services (e.g., advertising, location tracking, emergency communication means, etc.).

OTDOA (Observed Time Difference of Arrival)

The OTDOA method provides a UE with information on a reference cell and a neighboring cell and makes the UE measure and report a relative time difference between the reference cell and the neighboring cell via a specific signal (e.g., a PRS) to estimate a location of the UE based on the time difference.

If OTDOA assistance data and a physical cell ID of a neighboring cell are provided, a UE is able to detect an intra-frequency PRS and measure an RSTD during total time for detection and measurement. In this case, the RSTD corresponds to a relative time difference between a neighbor cell j and a reference cell i (i.e., $T_{SubframeRxj} - T_{SubframeRxi}$). In this case, the $T_{SubframeRxj}$ corresponds to time that the UE receives the start of a subframe from the cell j and the $T_{SubframeRxi}$ corresponds to time that the UE receives the start of a subframe from the cell i. The $T_{SubframeRxi}$ corresponds to time closest to the time at which the subframe is received from the cell j.

The total time for detection and measurement can be represented as equation 1 in the following.

$$T_{RSTD\ IntraFreqFDD,E-UTRAN} = T_{PRS} \cdot (M-1) + \Delta \text{ ms} \quad \text{[Equation 12]}$$

$T_{RSTD\ IntraFreqF\ DD,\ E-UTRAN}$ corresponds to the total time for performing detection and measurement in at least n number of cells. $T_{PRS}$ corresponds to a cell-specific positioning subframe configuration period. M corresponds to the number of PRS positioning occasions and each of the PRS positioning occasions corresponds to contiguous downlink positioning subframes of $N_{PRS}$ ($1 \leq N_{PRS} \leq 6$). The PRS positioning occasions can be defined as Table 1 in the following.

TABLE 1

| Positioning subframe configuration period | Number of PRS positioning occasions M | |
|---|---|---|
| $T_{PRS}$ | f1 | f1 and f2 |
| 160 ms | 16 | 32 |
| >160 ms | 8 | 16 |

When only intra-frequency RSTD measurements are performed over cells belonging to the serving FDD carrier frequency f1. When intra-frequency RSTD and inter-frequency RSTD measurements are performed over cells belonging to the serving FDD carrier frequency f1 and one inter-frequency carrier frequency f2, respectively.

And, $$\Delta = 160 \cdot \lceil \frac{n}{M} \rceil \text{ms}$$

corresponds to measurement time for single PRS positioning $N_{PRS}$ ($1 \leq N_{PRS} \leq 6$) including sampling time and processing time.

It is necessary for a UE physical layer to have capability capable of reporting an RSTD for a reference cell and all neighboring cells i located at the outside of at least (n−1) number of neighboring cells in the $T_{RSTD\ IntraFreqF\ DD,\ E-UTRAN}$. For all frequency bands of the reference cell, (PRS Ês/Iot)$_{ref} \geq -6$ dB should be satisfied. For all frequency bands of the neighboring cell i, (PRS Ês/Iot)$_i \geq -13$ dB should be satisfied. PRS Ês/Iot corresponds to an average reception energy ratio per PRS RE. This ratio is measured for all REs in which a PRS is carried.

As shown in FIG. 6, $T_{RSTD\ IntraFreqF\ DD,\ E-UTRAN}$ starts from a first subframe of a closest PRS positioning occasion after an OTDOA assistance data belonging to OTDOA-RequestLocationInformation and OTDOA-ProvideAssistanceData is received by a physical layer of a UE.

If intra-frequency handover occurs in the middle of measuring an intra-frequency RSTD, a UE should complete an OTDOA measurement session in progress. The UE should satisfy intra-frequency OTDOA measurement and accuracy request as well. In this case, $T_{RSTD\ IntraFreqFDD,\ E-UTRAN,\ HO}$ can be represented as equation 2 in the following.

$$T_{RSTDIntraFreqFDD,E-UTRANHO} = T_{RSTDIntraFreqFDD,E-UTRAN} + K \times T_{PRS} + T_{HO} \text{ ms} \quad \text{[Equation 13]}$$

In this case, K corresponds to the number of intra-frequency handovers occurred during $T_{RSTD\ IntraFreqFDD,\ E-UTRAN,\ HO}$ and $T_{HO}$ corresponds to a time period incapable of performing RSTD measurement due to the intra-frequency handover. The time period may have a period up to 45 ms.

Besides, for explanation on TDD intra-frequency, FDD-FDD inter-frequency OTDOA, and TDD-FDD inter-frequency OTDOA, it may refer to 3GPP TS 36.133.

For OTDOA, a base station can transmit information on a reference cell and information on neighboring cells to a UE via OTDOA-ProvideAssistanceData shown in Table 2 in the following.

TABLE 2

```
-- ASN1START
OTDOA-ProvideAssistanceData ::= SEQUENCE {
    otdoct-ReferenceCellInfo   OTDOA-ReferenceCellInfo      OPTIONAL, -- Need ON
    otdoa-NeighbourCellInfo    OTDOA-NeighbourCellInfoList  OPTIONAL, -- Need ON
    otdoa-Error                OTDOA-Error                  OPTIONAL, -- Need ON
    ...
}
-- ASN1STOP
```

In Table 2, the information (otdoa-ReferenceCellInfo) on the reference cell corresponds to an information element (IE) used by a location server to provide reference cell information for the OTDOA assistance data. The information can be represented as Table 3 in the following.

TABLE 3

```
-- ASN1START
OTDOA-ReferenceCellInfo ::= SEQUENCE {
    physCellId       INTEGER (0..503),
    cellGlobalId     ECGI                              OPTIONAL,    -- Need ON
    earfcnRef        ARFCN-ValueEUTRA                  OPTIONAL,    -- Cond NotSameAsServ0
    antennaPortConfig ENUMERATED {ports1-or-2, ports4, ... }
                                                       OPTIONAL     -- Cond NotSameAsServ1
    cpLength         ENUMERATED { normal, extended, ... },
    prsInfo          PRS-Info                          OPTIONAL,    -- Cond PRS
    ...,
    [[ earfcnRef-v9a0  ARFCN-ValueEUTRA-v9a0           OPTIONAL     -- Cond NotSameAsServ2
    ]]
}
-- ASN1STOP
```

In Table 3, the physCellId corresponds to a physical cell ID of a reference cell and the cellGlobalId corresponds to a unique ID of the reference cell in the overall system. The earfcnRef corresponds to EARFCN of the reference cell. The antennaPortConfig indicates an antenna port to be used for a specific reference signal among antenna ports 1, 2, and 4. The cpLength corresponds to a CP length of a reference cell PRS. The prsInfo corresponds to a PRS configuration of the reference cell.

Table 4 in the following shows a prsInfo information element.

TABLE 4

```
-- ASN1START
PRS-Info ::= SEQUENCE {
    prs-Bandwidth        ENUMERATED { n6, n15, n25, n50, n75, n100, ... },
    prs-ConfigurationIndex INTEGER (0..4095),
    numDL-Frames         ENUMERATED {sf-1, sf-2, sf-4, sf-6, ...},
    ...
    prs-MutingInfo-r9    CHOICE {
        po2-r9           BIT STRING (SIZE(2)),
        po4-r9           BIT STRING (SIZE(4)),
        po8-r9           BIT STRING (SIZE(8)),
        po16-r9          BIT STRING (SIZE(16))
        ...
    }                                              OPTIONAL   -- Need OP
}
-- ASN1STOP
```

In Table 4, the prs-Bandwidth corresponds to a band used for configuring a PRS and the prs-ConfigurationIndex corresponds to an IPRS corresponding to a PRS configuration index. The numDL-Frames corresponds to $N_{PRS}$ corresponding to the number of contiguous downlink subframes having a PRS. The prs-MutingInfo corresponds to a PRS muting configuration of a cell.

Information on a reference cell is used by a location server to inform a UE of the reference cell and neighboring cells, which are related to a cell defined by the information on the reference cell, are provided by information on the neighboring cells. The information on the neighboring cells provides a list of priority of measurement performed by a UE summarized in a descending order. A first cell of the list has a top measurement priority. The UE performs measurement according to the order provided by the location server.

Table 5 in the following shows a neighbor cell information element (OTDOA-NeighbourCellInfoList).

TABLE 5

```
-- ASN1START
OTDOA-NeighbourCellInfoList ::= SEQUENCE SIZE (1..maxFreqLayers)) OF OTDOA-NeighbourFreqInfo
OTDA-NeighbourFreqInfo ::= SEQUENCE (SIZE (1..24)) OF OTDA-NeighbourCellInfoElement
OTDOA-NeighbourCellInfoElement ::= SEQUENCE {
    physCellId              INTEGER (0...503),
    cellGlobalID            ECGI                    OPTIONAL,     -- Need ON
    earfcn                  ARFCN-ValueEUTRA        OPTIONAL,     -- Cond
NotSameAsRef0
    epLength                ENUMERATED {normal, extended, ...}
                                                    OPTIONAL,     -- Cond
NotSameAsRef1
    prsInfo                 PRS-Info                OPTIONAL      -- Cond
NotSameAsRef2
    antennaPortConfig       ENUMERATED {ports-1-or-2, ports-4, ...}
                                                    OPTIONAL      -- Cond
NotsameAsRef3
    slotNumberOffset        INTEGER (0..19)         OPTIONAL,     -- Cond NotSameAsRef4
    prs-SubframeOffset      INTEGER (0..1279)       OPTIONAL,     -- Cond InterFreq
    expectedRSTD            INTEGER (0..16383),
    expectedRSTD-Uncertainty INTEGER (0..1023),
    ...,
    [[ earfcn-v9a0          ARFCN-ValueEUTRA-v9a0 OPTIONAL        - Cond NotSameAsRef5
    ]]
}
maxFreqLayers INTEGER ::= 3
-- ASN1STOP
```

In Table 5, the physCellId corresponds to a physical cell ID of a neighbor cell and the cellGlobalId corresponds to a unique ID of the neighbor cell in the overall system. The earfcnRef corresponds to EARFCN of the neighbor cell. The cpLength corresponds to a CP length of the neighbor cell PRS. The prsInfo corresponds to a PRS configuration of the reference cell. The antennaPortConfig indicates an antenna port to be used for a cell-specific reference signal among antenna ports 1, 2, and 4. The slotNumberOffset corresponds to a slot number offset between the neighbor cell and the reference cell. The prs-SubframeOffset corresponds to an offset between a first PRS subframe in a reference carrier frequency layer of the reference cell and a first PRS subframe in a different carrier frequency layer of a different cell. The expectedRSTD indicates an RSTD value expected to be measured between the neighbor cell and the reference cell in a target device. The expectedRSTD-Uncertainty indicates uncertainty of the expectedRSTD value.

The UE receives the information on the reference cell and the information on the neighboring cells and reports an RSTD (reference signal time difference), RSTD quality, reference quality, and the like to a base station. The RSTD corresponds to a relative time difference between a neighboring cell j and a reference cell i. The RSTD is defined by a difference between time (TsubframeRxj) at which the UE receives a start of a subframe from the neighboring cell j and time (TsubframeRxi) at which the UE receives a start of a subframe closest to the subframe from the reference cell i.

Table 6 in the following shows OTDOA-SignalMeasurementInformation reported to the base station by the UE.

TABLE 6

```
-- ASN1START
OTDOA-SignalMeasurementInformaation ::= SEQUENCE {
    systemFrameNumber       BIT STRING (SIZE (10))
    physCellIdRef           INTEGER (0..503),
    cellGlobalIdRef         ECGI                    OPTIONAL,
    earfcnRef               ARFCN-ValueEUTRA        OPTIONAL,     -- Cond NotSameAsRef0
    referenceQuality        OTDOA-MeasQuality       OPTIONAL,
    neighbourMeasurementList NeighbourMeasurementList,
    ...,
    [[ earfcnRef-v9a0       ARFCN-ValueEUTRA-v9a0   OPTIONAL      -- Cond NotSameAsRef1
    ]]
}
NeighbourMeasurementList ::= SEQUENCE (SIZE(1..24)) OF NeighbourMeasurementElement
NeighbourMeasurementElement ::= SEQUENCE {
    physCellIdNeighbor      INTEGER (0..503),
    cellGlobalIdNeighbour   ECGI                    OPTIONAL,
    earfcnNeighbour         ARFCN-ValueEUTRA        OPTIONAL,     -- Cond NotSameAsRef2
    rstd                    INTEGER (0..12711),
    rstd-Quality            OTDOA-MeasQuality,
    [[ earfcnNeighbour-v9a0 ARFCN-ValueEUTRA-v9a0   OPTIONAL,     -- Cond NotSameAsRef3
    ]]
}
-- ASN1STOP
```

In Table 6, the systemFrameNumber corresponds to a system frame number on which the last measurement is performed. The physCellIdRef corresponds to a physical cell ID of a related reference cell that provides RSTDs. The cellGlobalIdRef corresponds to a unique ID (ECGI) of the related reference cell that provides RSTDs. The earfcnRef corresponds to E-UTRA carrier frequency of the reference cell used for measuring RSTD. The referenceQuality indicates the best estimation quality of arrival time measurement of a signal received from the reference cell used for calculating RSTD value. The neighborMeasurementList corresponds to a list in which measured RSTD values and measurement quality are included. The physCellIdNeighbor corresponds to physical cell IDs of neighboring cells that provide RSTDs. The cellGlobalIdNeighbor corresponds to a unique ID of neighboring cells that provide RSTDs. The earfcnNeighbor corresponds to E-UTRA carrier frequency of neighboring cells used for measuring RSTD. The rstd corresponds to a relative time difference between a reference cell and a neighboring cell. The rstd-Quality corresponds to the best estimation of a device for measured rstd quality.

As mentioned in the foregoing description, a PRS can be used for performing measurement in OTDOA. In the following, a PRS is explained in detail.

PRS (Positioning Reference Signal)

A PRS is a reference signal used for measuring a location of a UE and is transmitted in resource blocks configured to transmit the PRS only in a downlink subframe. A downlink subframe in which the PRS is transmitted corresponds to a positioning subframe. If both a normal subframe and an MBSFN (multicast-broadcast single frequency network) subframe are configured as the positioning subframe in a cell, OFDM symbols belonging to the MBSFN subframe use a CP (cyclic prefix) identical to a CP used in a subframe #0. If the MBSFN subframe is configured as a positioning subframe only in a cell, an extended CP is used in OFDM symbols configured to transmit a PRS in the MBSFN subframe. A start position of OFDM symbols configured to transmit a PRS in a subframe configured to transmit a PRS is identical to a start position of a subframe having a CP length identical to OFDM symbols configured to transmit a PRS. The PRS is transmitted via an antenna port 6. And, the PRS is not mapped to a resource element to which PBCH, PSS (primary synchronization signal), SSS (secondary synchronization signal), and the like are allocated.

A sequence for the PRS is generated by equation 3 in the following.

$$r_{l,n_s}(m) = \frac{1}{\sqrt{2}}(1 - 2\cdot c(2m)) + j\frac{1}{\sqrt{2}}(1 - 2\cdot c(2m+1)), \quad \text{[Equation 14]}$$

$$m = 0, 1, \ldots, 2N_{RB}^{max,DL} - 1$$

In equation 14, $n_s$ corresponds to a slot number and l indicates an OFDM symbol number in a slot. c(i) corresponds to a pseudo-random sequence and is initialized by equation 4 in the following.

$$c_{init} = \quad \text{[Equation 15]}$$
$$2^{10}\cdot(7\cdot(n_s+1)+l+1)\cdot(2\cdot N_{ID}^{cell}+1)+2\cdot N_{ID}^{cell}+N_{CP},$$

$$N_{CP} = \begin{cases} 1 & \text{for normal } CP \\ 0 & \text{for extended } CP \end{cases}$$

As shown in FIG. 6, the $r_{l,n_s}(m)$ generated by equation 3 is mapped to a complex number modulation symbol $a_{k,l}^{(p)} = r_{l,n_s}(m')$, which is used as a reference signal for an antenna port 6, by equation 5.

for normal CP: [Equation 16]

$$k = 6(m + N_{RB}^{DL} - N_{RB}^{PRS}) + (6 - l + v_{shift})\mod 6$$

$$l = \begin{cases} 3, 5, 6 & \text{if } n_s\mod 2 = 0 \\ 1, 2, 3, 5, 6 & \text{if } n_s\mod 2 = 1 \text{ and} \\ & (1 \text{ or } 2 \text{ } PBCH \text{ antenna ports}) \\ 2, 3, 5, 6 & \text{if } n_s\mod 2 = 1 \text{ and} \\ & (4 \text{ } PBCH \text{ antenna ports}) \end{cases}$$

$$m = 0, 1, \ldots, 2\cdot N_{RB}^{PRS} - 1$$

$$m' = m + N_{RB}^{max,DL} - N_{RB}^{PRS}$$

for extended CP $$k = 6(m + N_{RB}^{DL} - N_{RB}^{PRS}) + (5 - l + v_{shift})\mod 6$$

$$l = \begin{cases} 4, 5 & \text{if } n_s\mod 2 = 0 \\ 1, 2, 4, 5 & \text{if } n_s\mod 2 = 1 \text{ and } (1 \text{ or } 2 \text{ } PBCH \text{ antenna ports}) \\ 2, 4, 5 & \text{if } n_s\mod 2 = 1 \text{ and } (4 \text{ } PBCH \text{ antenna ports}) \end{cases}$$

$$m = 0, 1, \ldots, 2\cdot N_{RB}^{PRS} - 1$$

$$m' = m + N_{RB}^{max,DL} - N_{RB}^{PRS}$$

A cell-specific subframe configuration period $T_{PRS}$ for transmitting a PRS and a cell-specific subframe offset $\Delta_{PRS}$ can be determined by a PRS configuration index $I_{PRS}$ provided via a higher layer signal.

TABLE 7

| PRS configuration Index $I_{PRS}$ | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-4095 | | Reserved |

A PRS is transmitted in configured downlink subframes and is not transmitted in a special subframe. The PRS can be transmitted in $N_{PRS}$ number of contiguous downlink subframes (PRS positioning occasion) and the $N_{PRS}$ is configured by a higher layer signal. Among the $N_{PRS}$ number of contiguous downlink subframes, a first subframe satisfies equation 6 in the following.

$$(10\times n_f + \lfloor n_s/2 \rfloor - \Delta_{PRS})\mod T_{PRS} = 0 \quad \text{[Equation 17]}$$

Figure 12:
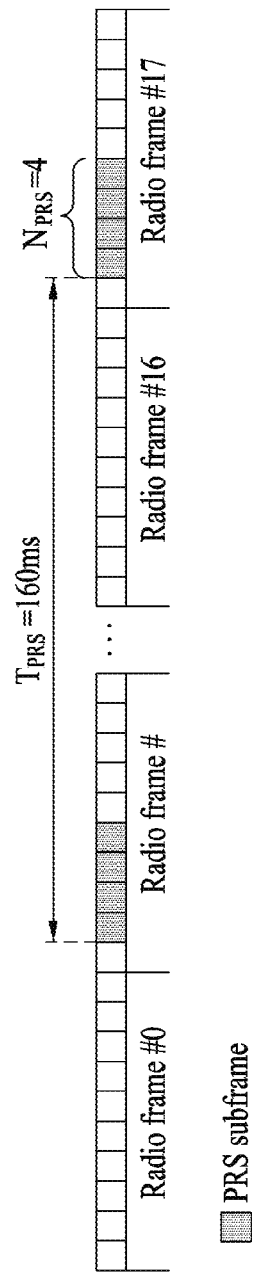

FIG. 12 shows an example of the aforementioned subframe in which the PRS is transmitted. In this case, the PRS positioning occasion $N_{PRS}$ corresponds to 4 and the $T_{PRS}$ corresponds to 160.

Meanwhile, besides the aforementioned OTDOA positioning scheme, it may use a barometer (also referred to as an altimeter, a baro-altimeter, etc.) for vertical positioning information. In particular, it may be able to know a height based on a measurement value of a measurement barometer using equation 7 described in the following.

$$p = p_0 e^{-\frac{Mg}{RT}h} \quad \text{[Equation 18]}$$

In equation 18, $p_0$ corresponds to the pressure of mean sea level, M corresponds to molecular weight of air, g corresponds to a gravitational constant, R corresponds to a universal gas constant, and T corresponds to the temperature in Kelvin. In particular, if atmospheric pressure is measured, it may be able to calculate a height h using the equation 7.

Yet, when a height is measured using a measurement value of a barometer, an error may occur due to surrounding environment. This is because a barometer sensor may generate an error according to a characteristic of a region at which a UE is positioned such as temperature, humidity, weather, fog, a position of a UE, and the like. For example, it may use a barometer sensor indoors in the cold weather like wintertime. In this case, if the barometer sensor is used on the basis of the outside weather (temperature and humidity), it has no choice but to have a considerable error of the barometer sensor. In the following description, a method of transmitting and receiving information related to a barometer is explained to solve the aforementioned problem.

Embodiment

Figure 13:
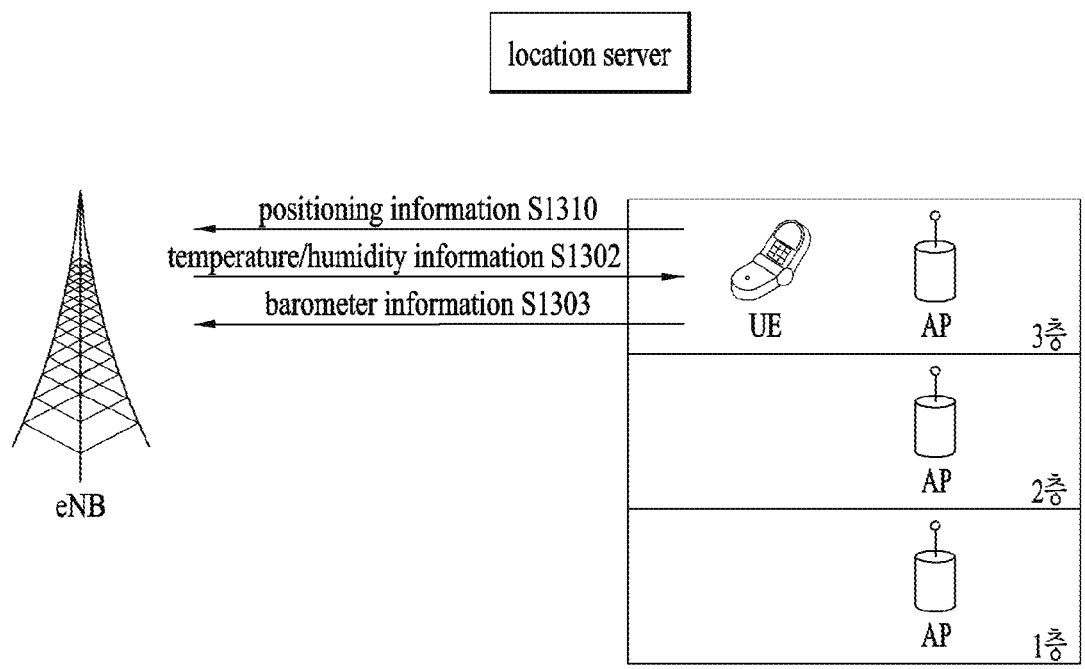
FIG. 13 is a flowchart for explaining an embodiment of the present invention.

Referring to FIG. 13, according to one embodiment of the present invention, a UE transmits positioning information to an eNB (S1301) and can receive temperature/humidity information based on the positioning information from the eNB (S1302). Subsequently, the UE can transmit barometer information based on the temperature/humidity information to the eNB (S1303). In this case, the barometer information can be corrected using the temperature/humidity information. The temperature/humidity information based on the positioning information may correspond to information measured by a network node closest to a horizontal position of the UE. In particular, in FIG. 13, the temperature/humidity information may correspond to information measured by an AP corresponding to a network node located at the same floor (height) with the UE. As mentioned in the following description, the temperature/humidity information transmitted to the UE by the eNB may correspond to information shared between network nodes via a backhaul or information collected by a location server and forwarded by the eNB.

And, the eNB can consider a barometer information as invalid, the barometer information is firstly transmitted by a UE which has not transmit a positioning information. Or, if barometer information is received after prescribed time is elapsed from the timing at which positioning information is transmitted, the eNB can consider the barometer information as invalid. In particular, as mentioned in the foregoing description, if barometer information of the UE is not corrected based on information received from the eNB or a network node, the eNB does not trust the barometer information of the UE.

The UE can include barometer information in either a discovery signal or a communication signal. In particular, the barometer information or the temperature/humidity information measured by the UE can be shared by neighboring UEs via D2D communication. The UE can signal the temperature/humidity information to the neighboring UEs using a physical layer signal or a higher layer signal via D2D discovery or D2D communication. Similarly, in order to determine validity of the shared temperature/humidity information, location information of a corresponding UE can be signaled as well. In this case, the location information can be shared by excluding an ID of the UE from the location information for the privacy of the UE. Or, if an application permits a UE to share temperature/humidity information of the UE in advance, the UE can share location information, the temperature/humidity information, and the like of the UE using a D2D discovery signal or a communication signal. The UE can share the temperature/humidity information with an eNB not equipped with a temperature/humidity information sensor. In this case, the UE can share the temperature/humidity information with the eNB only when the UE configures the eNB as a serving cell. Or, if the UE shares the location information, any eNB can share the location information. Yet, whether or not the location information is valid can be determined at a position of a specific node through information on a position at which the temperature/humidity information is examined.

As a method for supporting the aforementioned operation, it may be able to perform a signaling operation between network nodes and/or UEs. However, it is not mandatory that the following description and the aforementioned UE operation are used together. Each of the following description can be performed by a network node/UE as an individual operation.

Signaling Information on Whether or not Barometer Sensor is Installed

Information on whether or not a barometer sensor is installed can be signaled to network nodes. In particular, the information on whether or not a barometer sensor is installed can be included in UE capability information. This is because a location server or an eNB can perform vertical positioning only when the location server or the eNB knows whether or not a barometer sensor is installed in a UE. Hence, the UE can report information on whether or not the barometer sensor is installed in the UE and information on whether or not the UE is able to directly measure atmospheric pressure and height to a network (eNB) via physical layer signaling or higher layer signaling. If the eNB receives the information on whether or not the barometer sensor is installed in the UE from the UE, the eNB can signal the information to a location server using LPP or LPPa protocol. In this case, the information signaled to the location server can include all or a part of information such as a unique ID of the UE, a temporary ID of the UE, a phonebook, and the like to identify a UE in which the barometer sensor is installed.

Method of Requesting Barometer Sensor Information

A location server is able to know whether or not a barometer sensor is installed in a UE via UE capability signaling and the like. Hence, the location server may ask a UE equipped with the barometer sensor to feedback barometer measurement information.

If the location server is not aware of a UE equipped with the barometer sensor, the location server may ask a UE participating in positioning to feedback a measurement value of the barometer sensor. Having received the request, if the UE is equipped with the barometer sensor, the UE can report sensing information to a network (eNB or location server) via physical layer signaling or higher layer signaling. Having received the request, if the UE is not equipped with the barometer sensor, the UE may configure a corresponding field by a predetermined value or report corresponding information to the network via physical layer signaling or higher layer signaling without including the corresponding field.

Signaling Temperature/Humidity Information

A network, a location server, or an eNB can signal all or a part of information helpful in sensing a barometer such as weather/humidity/temperature information to a UE via physical layer signaling or higher layer signal (e.g., LPP protocol). The information can be optionally signaled to a UE equipped with a barometer sensor in advance or can be signaled to all UEs participating in LTE-based positioning (all techniques included in LPP, OTDOA, UTDOA, E-CID, GNSS, . . . ). The information may correspond to information provided to a UE only when the network determines that the information signaling is helpful (when the information signaling is defined as an optional feature).

When an eNB or an AP is installed indoors and a UE accesses the eNB/AP, it is preferable that the UE performs barometer sensing using internal weather/humidity/temperature rather than external weather/humidity/temperature.

The temperature/humidity information can be provided to all UEs participating in LTE-based positioning.

Capability Signaling of eNB or AP Capable of Measuring Weather/Humidity/Temperature A small cell (or an AP, hereinafter, a cell) can be installed indoors. And, the cell can collect temperature/humidity information by installing a temperature/humidity sensor in the cell. Similarly, if a cell equipped with a temperature/humidity sensor is installed outdoors, the cell can collect temperature/humidity information as well. And, a separate temperature/humidity sensor can be installed in a location server.

Among specific fixed nodes (eNB, AP, server, etc.), nodes equipped with a sensor capable of measuring temperature/humidity information (more specifically, information capable of providing help to a barometer sensor) can inform a location server of the function of the nodes and temperature/humidity information measured by the nodes. The location server may ask the eNB to send the temperature/humidity information (using LPPa protocol and the like). Having received the request, the eNB can signal the temperature/humidity information to the location server. Or, the eNB or the AP can periodically or aperiodically signal the temperature/humidity information to the location server together with a capability signal. If the temperature/humidity information is periodically signaled, the location server or an E-SMLC can configure a transmission period, timing, and the like of the temperature/humidity information. By doing so, the eNB or the AP can signal the temperature/humidity information.

If the eNB is equipped with a sensor capable of measuring temperature/humidity information, the eNB can share information on whether or not the temperature/humidity information is estimated, temperature/humidity information, and the like with a different eNB via backhaul signaling between the eNBs. If the temperature/humidity information is shared with the location server, the location server can signal the collected temperature/humidity information to a specific UE or a UE group via physical layer signaling or higher layer signaling (e.g., LPP protocol).

If an eNB including temperature/humidity information receives a request from a UE, the eNB can signal the temperature/humidity information to the UE via physical layer signaling or higher layer signaling. To this end, a separate temperature/humidity sensor can be installed in the eNB or the eNB may share temperature/humidity information received from a nearby eNB. In this case, the shared temperature/humidity information can be valid to the eNB only when a specific condition is satisfied. For example, the temperature/humidity information can be shared between eNBs located at the same building only. Or, the temperature/humidity information can be valid only when a distance between an AP and an eNB is equal to or less than a prescribed threshold value. In order to identify the validity of the temperature/humidity information, the eNB or the location server can signal location information of a node together with the temperature/humidity information to indicate a location or a node at which the information is measured.

Utilization of the present invention is not restricted to the barometer sensor only. For example, the present invention can be applied to a communication scheme (e.g., millimeter wave communication) affected by atmospheric environment such as temperature/humidity/fog, etc. Specifically, when a specific cell is installed outdoors, attenuation of a radio wave may have a considerable difference between a rainy day and a not rainy day. In particular, in this case, if temperature/humidity information received from a neighboring eNB or a location server is shared using the aforementioned scheme, it may be able to differently configure transmit power or beam direction using the information. If a change occurs on the abovementioned operation, all or a part of information on whether or not the operation is changed, information on a detail operation change parameter, and weather/temperature/humidity information can be signaled to UEs via physical layer signaling or higher layer signaling. Or, if a current attenuation is high, an eNB can indicate a UE to apply a specific offset to transmit power via physical layer signaling or higher layer signaling. Or, if the eNB recognizes very humid environment through feedback of a UE or other information, the eNB can signal a field capable of indicating a corresponding state to the UE via physical layer signaling or higher layer signaling. By doing so, the UE is able to distinguish weak signal strength due to current weather condition and the like from weak signal strength due to a poor channel.

Examples for the aforementioned proposed methods can also be included as one of implementation methods of the present invention. Hence, it is apparent that the examples are regarded as a sort of proposed schemes. The aforementioned proposed schemes can be independently implemented or can be implemented in a combined (aggregated) form of a part of the proposed schemes. It may be able to configure an eNB to inform a UE of information on whether to apply the proposed methods (information on rules of the proposed methods) via a predefined signal (e.g., physical layer signal or upper layer signal).

Configurations of Devices for Embodiments of the Present Invention

Figure 14:
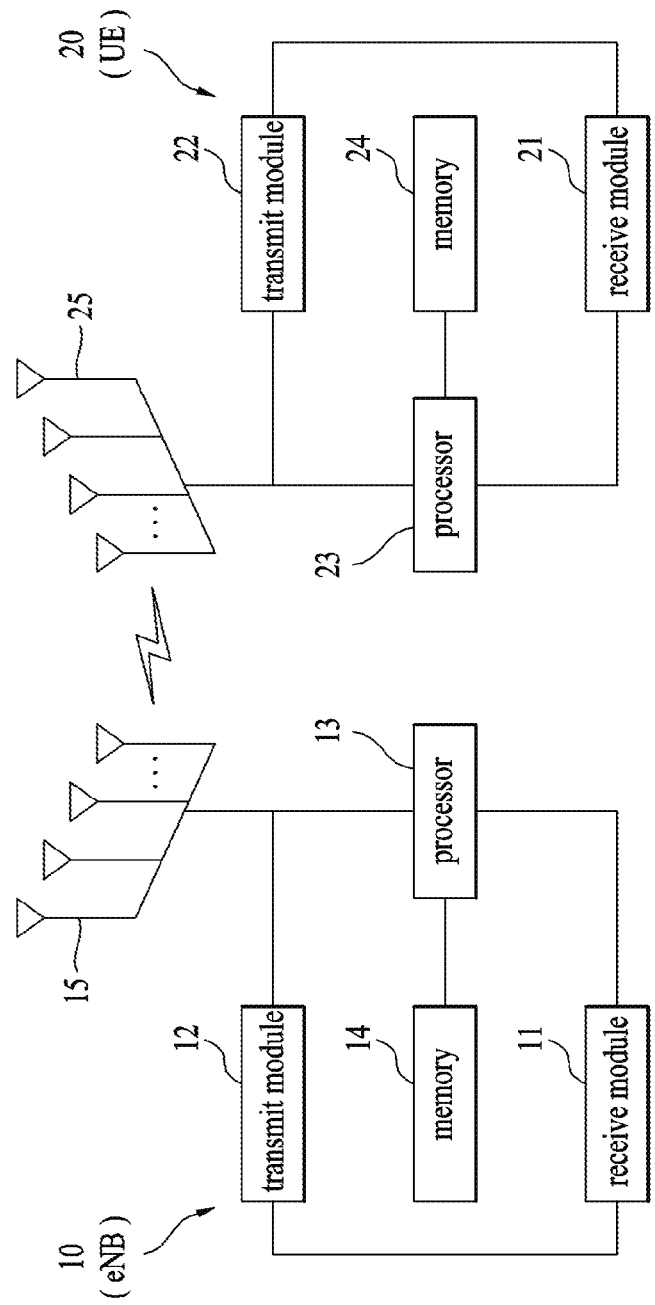
FIG. 14 is a diagram for configurations of a transmitter and a receiver.

FIG. 14 is a diagram for configurations of a transmitter and a receiver.

Referring to FIG. 14, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 14, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 14 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting and receiving information related to a barometer, which is transmitted and received by a user equipment (UE) in a wireless communication system, the method comprising:
   receiving, by the UE, temperature information and information related to a location at which the temperature information is measured; and
   determining, by the UE, altitude based on barometer information, the received temperature information, and the information related to the location,
   wherein the temperature information and the information related to the location are received via higher layer signaling,
   wherein the barometer information is considered as invalid by a network node, when the barometer information is first barometer-related information from the UE which has not transmitted positioning information.

2. The method of claim 1, wherein the positioning information corresponds to an RSTD (reference signal time difference) measurement result.

3. The method of claim 1, wherein the temperature information is measured by another network node closest to a horizontal position of the UE.

4. The method of claim 3, wherein the network node corresponds to one selected from the group consisting of an eNB, an AP (access point), and a location server.

5. The method of claim 1, wherein the UE includes the barometer information in a discovery signal or a communication signal.

6. A method of transmitting and receiving barometer information, which is transmitted and received by a network node in a wireless communication system, the method comprising:
   transmitting, from the network node to a user equipment (UE), temperature information and information related to a location at which the temperature is measured; and
   wherein an altitude of the UE is determined by the UE based on the barometer information, the temperature information, and the information related to the location,
   wherein the temperature information and the location information related to the location are received via higher layer signaling,
   receiving, by the network node, the barometer information from the UE,
   wherein the barometer information is evaluated by the UE using the temperature information and the location information,
   wherein the network node considers the barometer information as invalid, when the barometer information is first barometer-related information from the UE which has not transmitted positioning information.

7. The method of claim 6, wherein the positioning information corresponds to an RSTD (reference signal time difference) measurement result.

8. The method of claim 6, wherein the temperature information is measured by another network node closest to a horizontal position of the UE.

9. The method of claim 8, wherein the network node corresponds to one selected from the group consisting of an eNB, an AP (access point), and a location server.

10. The method of claim 6, wherein the UE includes the barometer information in a discovery signal or a communication signal.

* * * * *